United States Patent
Pateromichelakis et al.

(10) Patent No.: US 12,144,009 B2
(45) Date of Patent: Nov. 12, 2024

(54) CONTROL UNIT AND METHOD FOR ASSISTING SIDE-LINK COMMUNICATION

(71) Applicant: Huawei Technologies Co., Ltd., Shenzhen (CN)

(72) Inventors: Emmanouil Pateromichelakis, Munich (DE); Chan Zhou, Munich (DE); Henrik Olofsson, Kista (SE); Wenjie Peng, Shanghai (CN); Jun Wang, Shanghai (CN); Haiyan Luo, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 429 days.

(21) Appl. No.: 17/486,560

(22) Filed: Sep. 27, 2021

(65) Prior Publication Data

US 2022/0015088 A1    Jan. 13, 2022

Related U.S. Application Data

(63) Continuation of application No. PCT/EP2019/057933, filed on Mar. 28, 2019.

(51) Int. Cl.
*H04W 72/51* (2023.01)
(52) U.S. Cl.
CPC .................................. *H04W 72/51* (2023.01)
(58) Field of Classification Search
CPC . H04W 36/305; H04W 4/40; H04W 36/0011; H04W 72/40; H04W 72/02; H04W 72/0453
See application file for complete search history.

(56) References Cited

U.S. PATENT DOCUMENTS

| | | | |
|---|---|---|---|
| 11,388,733 B2 * | 7/2022 | Huang | ................... H04W 76/27 |
| 2018/0049015 A1 | 2/2018 | Gupta et al. | |

(Continued)

FOREIGN PATENT DOCUMENTS

| | | |
|---|---|---|
| CN | 108370576 A | 8/2018 |
| CN | 109040322 A | 12/2018 |

(Continued)

OTHER PUBLICATIONS

Elayoubi et al., "5G RAN Slicing for Verticals: Enablers and Challenges," Network and Service Management, IEEE Communications Magazine, IEEE Service Center, Piscataway, US, vol. 57, No. 1, total pp. 28-34, XP011705286 (Jan. 2019).

(Continued)

*Primary Examiner* — Iqbal Zaidi
(74) *Attorney, Agent, or Firm* — Leydig, Voit & Mayer, Ltd.

(57) ABSTRACT

The present disclosure relates to the fields of mobile communication, connected driving, Internet of vehicles (IoV), self-driving car, and autonomous car. More specifically, the present disclosure relates to side-link communication and network slicing. The present disclosure provides a control unit for assisting side-link communication for at least one slice of a communication network, wherein the control unit is configured to obtain at least one of an upper layer requirement, and a session requirement; and to configure, for the at least one slice, at least one side-link resource pool based on the upper layer requirement and/or session requirement.

12 Claims, 11 Drawing Sheets

(56) References Cited

U.S. PATENT DOCUMENTS

| | | | |
|---|---|---|---|
| 2018/0054237 A1 | 2/2018 | Tseng et al. | |
| 2018/0176858 A1 | 6/2018 | Wang et al. | |
| 2018/0270666 A1 | 9/2018 | Lee et al. | |
| 2019/0222979 A1* | 7/2019 | Hahn | H04W 76/27 |
| 2020/0092685 A1* | 3/2020 | Fehrenbach | H04W 76/27 |

FOREIGN PATENT DOCUMENTS

| | | |
|---|---|---|
| CN | 109247076 B | 7/2021 |
| EP | 3343980 A1 | 7/2018 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.4.0, total 933 pages, 3rd Generation Partnership Project, Valbonne, France (Dec. 2018).

LG Electronics Inc., "Text Proposal on support of sidelink resource allocation," 3GPP TSG-RAN WG3 Meeting #103, Athens, Greece, R3-190132, total 6 pages, 3rd Generation Partnership Project, Valbonne, France (Feb. 25-Mar. 1, 2019).

"3rd Generation Partnership Project; Technical Specification Group Radio Access Network; NR; Radio Resource Control (RRC) protocol specification (Release 15)," 3GPP TS 38.331 V15.4.0, total 474 pages, 3rd Generation Partnership Project, Valbonne, France (Dec. 2018).

"3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401 V16.2.0, total 418 pages, 3rd Generation Partnership Project, Valbonne, France (Mar. 2019).

"3rd Generation Partnership Project; Technical Specification Group Services and System Aspects; Management and orchestration; Provisioning; (Release 16)," 3GPP TS 28.531 V16.0.0, total 64 pages, 3rd Generation Partnership Project, Valbonne, France (Dec. 2018).

"3rd Generation Partnership Project; Technical Specification Group Radio Access Network; NG-RAN; NG Application Protocol (NGAP)(Release 15)," 3GPP TS 38.413 V15.2.0, total 308 pages, 3rd Generation Partnership Project, Valbonne, France (Dec. 2018).

"3rd Generation Partnership Project; Technical Specification Group Services and System Aspects; Enhancement of 3GPP support for V2X scenarios; Stage 1 (Release 16)," 3GPP TS 22.186 V16.1.0. total 18 pages, 3rd Generation Partnership Project, Valbonne, France (Dec. 2018).

"3rd Generation Partnership Project; Technical Specification Group Services and System Aspects; System Architecture for the 5G System; Stage 2 (Release 15)," 3GPP TS 23.501 V15.5.0, total 241 pages, 3rd Generation Partnership Project, Valbonne, France (Mar. 2019).

"3rd Generation Partnership Project; Technical Specification Group Services and System Aspects; Study on architecture enhancements for EPS and 5G System to support advanced V2X services (Release 16)," 3GPP TR 23.786 V2.0.0, total 119 pages, 3rd Generation Partnership Project, Valbonne, France (Mar. 2019).

"3rd Generation Partnership Project; Technical Specification Group Radio Access Network; NR; NR and NG-RAN Overall Description; Stage 2 (Release 15)," 3GPP TS 38.300 V15.4.0, total 97 pages, 3rd Generation Partnership Project, Valbonne, France (Dec. 2018).

"3rd Generation Partnership Project; Technical Specification Group Services and System Aspects; Procedures for the 5G System; Stage 2 (Release 16)," 3GPP TS 23.502 V16.0.0, total 420 pages, 3rd Generation Partnership Project, Valbonne, France (Mar. 2019).

* cited by examiner

CONTROL UNIT AND METHOD FOR ASSISTING SIDE-LINK COMMUNICATION

CROSS-REFERENCE TO RELATED APPLICATIONS

This application is a continuation of International Application No. PCT/EP2019/057933, filed on Mar. 28, 2019, the disclosure of which is hereby incorporated by reference in its entirety.

TECHNICAL FIELD

The present disclosure relates to the field of mobile communication. More specifically, the present disclosure relates to side-link (SL) communication and network slicing. In particular, the present disclosure relates to a control unit and a method for assisting side-link communication. The present disclosure also relates to a terminal device and a management entity for side-link communication.

BACKGROUND

Enhanced vehicular to everything (eV2X) can be seen as special 5G service type, which includes both safety and non-safety services, according to TS 22.186. Side-link transmission (over the PC5 interface) is a key operation mode for cellular-assisted vehicular to everything (aka C-V2X or 5G-V2X) services, whereas LTE-Uu or NR-Uu (the interface between a UE and the 5G-BS or gNB) can support the control plane (CP), and for some cases the User Plane (UP) for the communications between vehicles.

For the particular case of New Radio (NR), NR-PC5 may use unlicensed (e.g. ITS bands) or licensed spectrum; hence it can be seen as part of NR configuration. In particular, the side-link/PC5 interface between two or more vehicles (which comprises the resources and functions related to the communication over the PC5 interface) can be defined as a standalone NR Configuration option or as a part of NR Configuration comprising NR-PC5 and LTE-Uu or NR-Uu links.

The concept of network slicing is introduced in 5G to address the various requirements from multiple vertical industries assuming a shared network infrastructure. Network services can be customized based on the requirements of different use cases and thus increase the network operation efficiency. Network slicing is an end to end concept according to the current definition being discussed in 3GPP (cf. TS23.501). In this regard, the slicing granularity can be seen as overarching policies on top of QoS/service granularity, considering the business aspects of 5G network logical partitioning to meet the vertical requirements. V2X Standardized Slice Type (SST) was recently introduced for this purpose in SA2 (cf. TR23.786):

In this framework, two operation modes are defined. In the first operation mode, also indicated as Mode 1, a network node, such as a base station (e.g., RAN device, gNB, and the like) schedules side-link resource(s) to be used by an end device or User Equipment (UE), such as a vehicle or V-UE, for side-link transmission(s). In the second operation mode, also indicated as Mode 2, the end device determines the side-link transmission resource(s) within the side-link resources, which are configured by the network node, or within pre-configured side-link resources. In other words, in Mode 2 operation the network node does not schedule resources but rather configures resource pools, while the end device performs autonomous scheduling.

V2X

In the prior art, RAN is aware of the slice from the Core Network, by the Protocol Data Unit (PDU) Session information at the initial establishment of the session. However, for V2X communications, no PDU session is established for the V2X communication among UEs (since PDU session is defined as the user-plane session between a UE and the Core Network). It is not specified how RAN will get slice information for side-link communications and what information is needed at RAN for managing the resource pools.

Furthermore, RAN may need to interact with Core Network (CN), e.g. for charging, mobility management; and/or other RAN nodes (for resource optimization and handover control) and OAM (for slice monitoring/management) about the V2X Slicing operation. The interaction in this case for V2X sessions is not supported per slice granularity and new information elements and messages are required for supporting such interactions.

To summarize, if slicing applies to V2X services over side-link, this has an impact on RAN for configuring/assigning/providing side-link resources to end devices in a slice-based manner, if one RAN configuration including a side-link is utilized by at least one slice.

In the prior art, the problem of resource pool configuration is addressed without considering the slicing criterion.

Based on the NR principles for slice awareness (as stated in TS 38.300, section 16.3.1) the problem of resource management and isolation is a problem of network node, such as a RAN node, to manage radio resources. However this applies currently only for NR-Uu resources, since the granularity is per PDU session. The problem of how the RAN will be aware for the case when the RAN part of the Slice is an NR-PC5 resource and how RAN will configure the resource pools per slice has yet not be addressed.

As it is outlined in view of the above prior art solutions, the prior art lacks for a solution to configure side-link in a versatile manner, based on various requirements. In particular, no solution is present to integrate network slicing into side-link communication.

SUMMARY

In view of the above-mentioned problems and disadvantages, devices and methods are provided to improve the conventional ways for configuring side-link communication.

An object is achieved by the solution provided in the enclosed independent claims. Advantageous implementations are further defined in the dependent claims.

According to a first aspect, the present disclosure provides a control unit for assisting side-link communication for at least one slice of a communication network, wherein the control unit is configured to: obtain at least one of an upper layer requirement, and a session requirement; and configure, for the at least one slice, at least one side-link resource pool based on the upper layer requirement and/or session requirement.

In particular, by configuring the at least one side-link resource pool, the control unit generates a resource pool configuration.

In particular, the control unit can be located in, or implemented by a RAN (e.g. a RAN node).

In particular, a RAN node can be, or can be implemented by means of at least one of the following: a Central Unit (CU), a Distributed Unit (DU), a gNB, an eNB, a Master Node (MN), a Secondary Node (SN), a RoadSide Unit (RSU).

In this manner resource isolation between slices can be obtained, for example in the case that the control unit is implemented in a Ran node and where the RAN part of the slice is the link between end devices, for instance a side-link such as the PC5, in particular the NR-PC5 interface. In this manner, the slicing principles apply also for the side-link V2X communications.

The control unit according to embodiments of the disclosure enables slice awareness for side-link Vehicle to Vehicle (V2X) communications by a UE or CN and/or OAM, and allow to configure and schedule per slice resource pools for side-link V2X communications (e.g. in 1:N and N:1 resource pool to slice mappings).

Slice awareness may be achieved by obtaining a slice configuration and in particular Radio Resource Management (RRM) policies and/or resource pool configuration policies related to a PC5/V2X session by OAM, and by obtaining slice information related to a PC5/V2X session, by CN or UE, so as to map the session to a certain slice or slicing for scheduling purposes.

Configuration and scheduling may be achieved by processing the slice information of each session and map the slice traffic to different resource pools and/or resource pool configurations at Radio Resource Control (RRC) and/or RRM layer of the RAN node, as well as by scheduling the resource pools per slice at MAC layer of the RAN node, and e.g. by communicating the resource pool configuration to other involved nodes in RAN, for example at least one of the following:
- a Central Unit (CU),
- a Distributed Unit (DU),
- a gNB,
- an eNB,
- a Master Node (MN)
- a Secondary Node (SN)
- a RoadSide Unit (RSU),
- a CN node
- an application-domain nodes.

In an implementation form of the first aspect, the control unit is further configured to obtain the upper layer requirement from a management entity and/or application entity.

In particular, the management entity comprises an operation, administration and management (OAM) function. In particular, the application entity comprises an application server.

In a further implementation form of the first aspect, the upper layer requirement includes at least one of the following configuration parameters: Slice identifier and/or Network Slice Network Slice Selection Assistance Information (NSSAI) and/or Slice Profile identifier; Slice policies per side-link service for a network domain, in particular RRM policies for RAN domain; slice mapping information for mapping at least one of a session and a service to at least one slice; mode mapping information for mapping a service to a first or a second operation mode; Geographical Area; Time Validity; Application or Network Management related statistics/analytics which indicate expected network and/or application related conditions.

In particular, network related conditions can include an expected change of at least one of the following: network subnet performance, radio resource availability, slice congestion, slice load, slice availability, QoS in a geographical area, radio failure.

In particular, application related conditions can include an expected change of application requirements, more particularly at least one of: a Level of Automation for a V2X session, the group formation of the vehicles, the group size and cluster head of the session, application QoS, user routes/trajectories.

In particular, the first operation mode may be referred to as mode 1, according to which scheduling is done by a network node, for example a base station (BS). In particular, the second operation mode may be referred to as mode 2, according to which scheduling is done by the terminal device which establishes the side-link connection.

In a further implementation form of the first aspect, the session requirement includes at least one of the following parameters: Slice identifier and/or S-NSSAI/NSSAI; Session identifier; Group terminal device information identifier; Session Resource Setup Request for side-link session; Side-link Aggregate Maximum Bit Rate (AMBR); Side-link Quality of Service, QoS, levels; mode mapping information for mapping a service to a first or a second operation mode; a list of available slices for the terminal device; a list of resource pools available to the terminal device for each slice.

In particular, the Session Resource Setup Request may comprise the SL resource setup request for the session. In particular, the side-link AMBR may comprise parameters for the authorization of the PC5 session. In particular, the Side-link QoS levels may comprise 5QI or ProSe Per-Packet Priority (PPPP). The side link QoS level can in particular depend on the Level of Automation of the side-link terminal device (for instance manual/automated driving) and on the slice. In particular, the first operation mode may be referred to as mode 1, according to which scheduling is done by a base station (BS). In particular, the second operation mode may be referred to as mode 2, according to which scheduling is done by the terminal device which establishes the side-link connection. In particular, the list of available slices for the terminal device may comprise the slices supported by the UE communicating in side-link.

In a further implementation form of the first aspect, the session requirement includes at least one of a network requirement obtained by a network entity and a terminal device requirement obtained from a terminal device for side-link communication.

In particular, the network entity may be a node or a function in the core network or in the access network (RAN).

In a further implementation form of the first aspect, the at least one side-link resource pool configuration comprises at least one of the following parameters: Slice identifier and/or NSSAI and/or S-NSSAI; Group terminal device information identifier; Allocated resources per side-link session; Common Rx Pool List; Common Tx Pool List; side-link Resource Pool Configuration information; Slice RRM Policies; Resource Selection information; Geographical Area; Time Validity; mode mapping information for mapping a service to a first or a second operation mode.

In a further implementation form of the first aspect, the control unit is configured to provide notification information to a further network node about the side-link resource pool configuration.

In a further implementation form of the first aspect, the notification information comprises at least one of: configuration update notification information for at least one session; resource pool configuration parameters; terminal device-related statistics for the terminal device utilizing side-link resources; configuration update notification information for at least one slice coverage area; Slice-related statistics for the slice utilizing side-link resources.

In particular, the notification information is terminal device-specific information.

In a further implementation form of the first aspect, the resource pool configuration parameters include at least one of: session configuration parameters for configuring a terminal device associated to at least one slice; and slice configuration parameters for configuring a geographical area.

In particular, the session configuration parameters can be terminal associated configuration parameters. In particular, the slice configuration parameters are non-terminal associated configuration parameters, such as parameters to be applied within a cell and/or geographical area coverage.

In a further implementation form of the first aspect, the control unit is configured to provide the side-link resource pool configuration to a network node using at least one of X2, XnAP, and/or F1, and NGAP signaling.

According to a second aspect, the present disclosure provides a terminal device for performing side-link communication, wherein the terminal device is configured to: generate a session requirement, the session requirement including information for configuring a side-link communication for at least one slice; and to provide the generated session requirement to the control unit.

In particular, the terminal device can be a UE, a mobile station or a mobile device.

In particular, the session requirement includes at least one of the following parameters: Slice identifier and/or S-NSSAI/NSSAI; Session identifier; Group terminal device information identifier; Session Resource Setup Request for side-link session; Side-link AMBR; Side-link Quality of Service, QoS, levels; mode mapping information for mapping a service to a first or a second operation mode; a list of available slices for the terminal device; a list of resource pools available to the terminal device for each slice.

In particular, the Session Resource Setup Request may comprise the SL resource setup request for the session. In particular, the side-link AMBR may comprise parameters for the authorization of the PC5 session. In particular, the Side-link QoS levels may comprise 5QI or PPPP. The side link QoS level can in particular depend on the Level of Automation of the side-link terminal device (for instance manual/automated driving) and on the slice. In particular, the first operation mode may be referred to as mode 1, according to which scheduling is done by a base station (BS). In particular, the second operation mode may be referred to as mode 2, according to which scheduling is done by the terminal device which establishes the side-link connection. In particular, the list of available slices for the terminal device may comprise the slices supported by the UE communicating in side-link.

In particular, the session requirement includes a terminal device requirement obtained by the terminal device.

According to a third aspect, the present disclosure provides a management entity for managing side-link communication for at least one slice of a communication network, wherein the management entity is configured to: generate an upper layer requirement for the at least one slice; and to provide the generated upper layer requirement to the control unit.

In particular, the upper layer requirement includes at least one of the following configuration parameters: Slice identifier and/or NSSAI and/or Slice Profile identifier; Slice policies per side-link service for a network domain, in particular RRM policies for RAN domain; slice mapping information for mapping at least one of a session and a service to at least one slice; mode mapping information for mapping a service to a first or a second operation mode; Geographical Area; Time Validity; Application or Network Management statistics/analytics on network and/or application related conditions.

According to a fourth aspect, the present disclosure provides a method for assisting side-link communication for at least one slice of a communication network, wherein the method comprises the steps of: obtaining, by a control unit, at least one of an upper layer requirement, and a session requirement; and configuring, by the control unit, for the at least one slice, at least one side-link resource pool based on the upper layer requirement and/or session requirement.

In particular, by configuring the at least one side-link resource pool, the control unit generates a resource pool configuration.

In an implementation form of the fourth aspect, the method further includes obtaining, by the control unit, the upper layer requirement from a management entity and/or application entity.

In particular, the management entity comprises an operation, administration and management (OAM) function. In particular, the application entity comprises an application server, in particular at least one of: an Application Function (AF), an V2X application specific server, a V2X application enabler server (as defined in TS23.286), a Service Enabled Application Layer (SEAL) Server, as specified in TS 23.434.

In a further implementation form of the fourth aspect, the upper layer requirement includes at least one of the following configuration parameters: Slice identifier and/or NSSAI and/or Slice Profile identifier; Slice policies per side-link service for a network domain, in particular RRM policies for RAN domain; slice mapping information for mapping at least one of a session and a service to at least one slice; mode mapping information for mapping a service to a first or a second operation mode; Geographical Area; Time Validity; Application or Network Management statistics/analytics on network and/or application related conditions.

In particular, network related conditions can include an expected change of at least one of the following: network subnet performance, radio resource availability, slice congestion, slice load, slice availability, QoS in a geographical area, radio failure.

In particular, application related conditions can include an expected change of application requirements, more particularly at least one of: a Level of Automation for a V2X session, the group formation of the vehicles, the group size and cluster head of the session, application QoS, user routes/trajectories.

In particular, the first operation mode may be referred to as mode 1, according to which scheduling is done by a base station (BS). In particular, the second operation mode may be referred to as mode 2, according to which scheduling is done by the terminal device which establishes the side-link connection.

In a further implementation form of the fourth aspect, the session requirement includes at least one of the following parameters: Slice identifier and/or S-NSSAI/NSSAI; Session identifier; Group terminal device information identifier; Session Resource Setup Request for side-link session; Side-link AMBR; Side-link Quality of Service, QoS, levels; mode mapping information for mapping a service to a first or a second operation mode; a list of available slices for the terminal device; a list of resource pools available to the terminal device for each slice.

In particular, the Session Resource Setup Request may comprise the SL resource setup request for the session. In particular, the side-link AMBR may comprise parameters for the authorization of the PC5 session. In particular, the Side-link QoS levels may comprise 5QI or PPPP. The side link QoS level can in particular depend on the Level of Automation of the side-link terminal device (for instance manual/automated driving) and on the slice. In particular, the first operation mode may be referred to as mode 1, according to which scheduling is done by a base station (BS). In particular, the second operation mode may be referred to as mode 2, according to which scheduling is done by the terminal device which establishes the side-link connection. In particular, the list of available slices for the terminal device may comprise the slices supported by the UE communicating in side-link.

In a further implementation form of the fourth aspect, the session requirement includes at least one of a network requirement obtained by a network entity and a terminal device requirement obtained from a terminal device for side-link communication.

In particular, the network entity may be a node or a function in the core network or in the access network (RAN).

In a further implementation form of the fourth aspect, the at least one side-link resource pool configuration comprises at least one of the following parameters: Slice identifier and/or NSSAI and/or S-NSSAI; Group terminal device information identifier; Allocated resources per side-link session; Common Rx Pool List; Common Tx Pool List; side-link Resource Pool Configuration information; Slice RRM Policies; Resource Selection information; Geographical Area; Time Validity; mode mapping information for mapping a service to a first or a second operation mode.

In a further implementation form of the fourth aspect, the method further includes providing, by the control unit, notification information to a further network node about the side-link resource pool configuration.

In a further implementation form of the fourth aspect, the notification information comprises at least one of: configuration update notification information for at least one session; resource pool configuration parameters; terminal device-related statistics for the terminal device utilizing side-link resources; configuration update notification information for at least one slice coverage area; Slice-related statistics for the slice utilizing side-link resources.

In particular, the notification information is terminal device-specific information.

In a further implementation form of the fourth aspect, the resource pool configuration parameters include at least one of: session configuration parameters for configuring a terminal device associated to at least one slice; and slice configuration parameters for configuring a geographical area.

In particular, the session configuration parameters can be terminal associated configuration parameters. In particular, the slice configuration parameters are non-terminal associated configuration parameters, such as parameters to be applied with a cell and/or geographical area coverage.

In a further implementation form of the fourth aspect, the method further includes providing, by the control unit, the side-link resource pool configuration to a network node using at least one of X2, XnAP, and/or F1, and NGAP signaling.

The method according to the fourth aspect and its implementation forms achieve the same advantages as the unit according to the first aspect and its respective implementation forms.

According to a fifth aspect, the present disclosure provides a method for performing side-link communication, wherein the method comprises: generating, by a terminal device, a session requirement, the session requirement including information for configuring a side-link communication for at least one slice; and to providing, by the terminal device, the generated session requirement to the control unit.

In particular, the terminal device can be a UE, a mobile station or a mobile device.

In particular, the session requirement includes at least one of the following parameters: Slice identifier and/or S-NSSAI/NSSAI; Session identifier: Group terminal device information identifier; Session Resource Setup Request for side-link session; Side-link AMBR; Side-link Quality of Service, QoS, levels; mode mapping information for mapping a service to a first or a second operation mode; a list of available slices for the terminal device; a list of resource pools available to the terminal device for each slice.

In particular, the Session Resource Setup Request may comprise the SL resource setup request for the session. In particular, the side-link AMBR may comprise parameters for the authorization of the PC5 session. In particular, the Side-link QoS levels may comprise 5QI or PPPP. The side link QoS level can in particular depend on the Level of Automation of the side-link terminal device (for instance manual/automated driving) and on the slice. In particular, the first operation mode may be referred to as mode 1, according to which scheduling is done by a base station (BS). In particular, the second operation mode may be referred to as mode 2, according to which scheduling is done by the terminal device which establishes the side-link connection. In particular, the list of available slices for the terminal device may comprise, the slices supported by the UE communicating in side-link.

In particular, the session requirement includes a terminal device requirement obtained by the terminal device.

According to a sixth aspect, the present disclosure provides a method for managing side-link communication for at least one slice of a communication network, wherein the method comprises the steps of: generating, by a management entity, an upper layer requirement for the at least one slice; and providing, by the management entity, the generated upper layer requirement to the control unit.

In particular, the upper layer requirement includes at least one of the following configuration parameters: Slice identifier and/or NSSAI and/or Slice Profile identifier; Slice policies per side-link service for a network domain, in particular RRM policies for RAN domain; slice mapping information for mapping at least one of a session and a service to at least one slice; mode mapping information for mapping a service to a first or a second operation mode; Geographical Area; Time Validity; Application or Network Management statistics/analytics on network and/or application related conditions.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
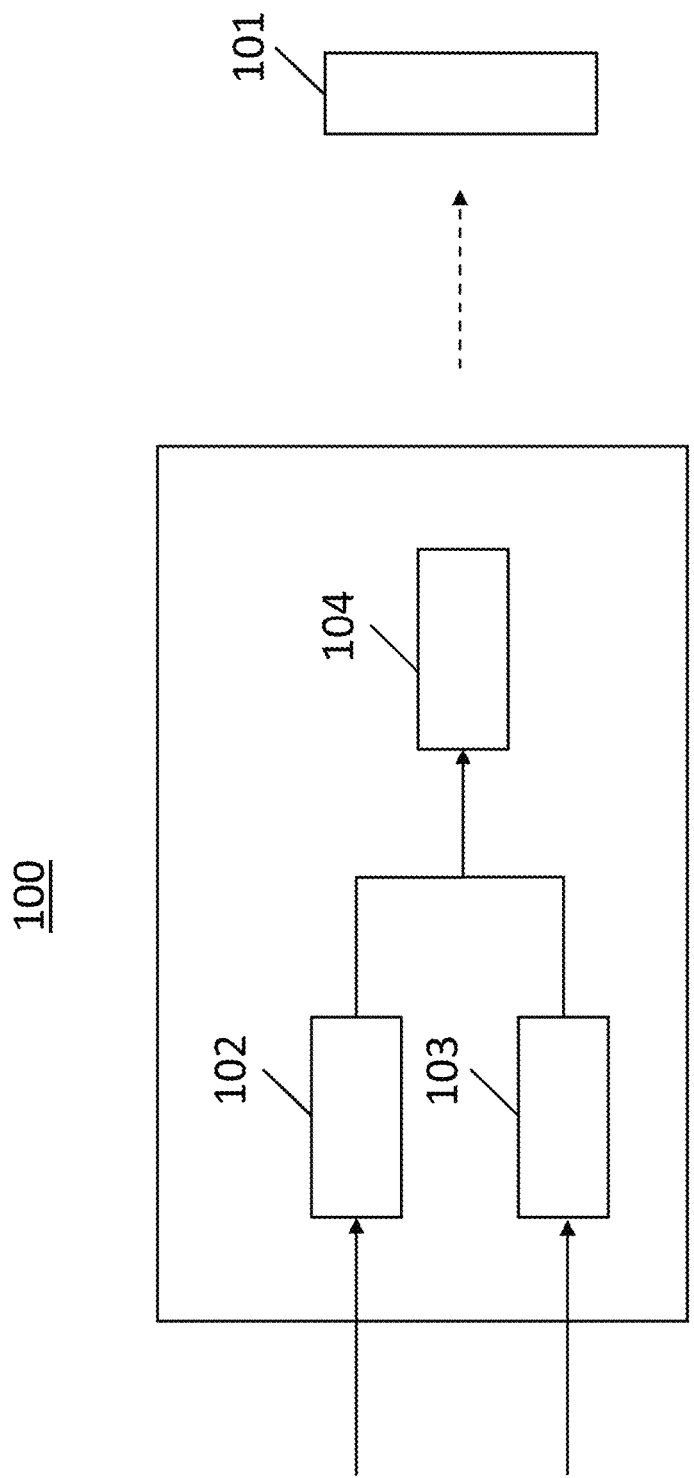
FIG. 1 shows a schematic view of a control unit according to an embodiment of the present disclosure.

FIG. 1 shows a control unit 100 according to an embodiment of the present disclosure. The control unit 100 is for assisting side-link communication for at least one slice 101 of a communication network. To this end, the control unit 100 is configured to obtain at least one of an upper layer requirement 102, and a session requirement 103. The control unit is further configured to configure, for the at least one slice 101, at least one side-link resource pool 104 based on the upper layer requirement 102 and/or session requirement 103.

In other words, by configuring the at least one side-link resource pool 104, the control unit 100 generates a resource pool configuration 104.

The control unit 100 thereby allows for enabling the RAN/Network to configure side-link resource pools 104 per slice for V2X sessions. The configuration e.g. may be based on the upper layer and/or the session-related requirement which may comprise at least one of the following:
- the slice-to-resource pool initial mapping ratio (N:1, 1:N);
- Mobile Network Operator and Vertical agreements (slice SLA);
- resource pool and/or slice situation/availability;
- UE behavior; as well as
- application-related requirements (group formations, level of automations).

In other words, the control unit 100 as shown in FIG. 1 can reside in a RAN node (e.g. a gNB, eNB, CU, MN, or SN) and can be configured to:
- A: Receive slice-specific NR configuration parameters (mapping policies, e.g. 1:N or N:1 slice to Resource Pool (RP) mapping, NR-PC5 RRM split, spectrum configurations, slice coverage, etc.) by OAM (e.g. the upper layer requirement 102) and/or slice-to-PC5 session mapping and identification by CN (using NGAP signaling) or by the UE (using RRC signaling) (e.g. the session requirement 103).
- B: Configure (pre- or re-configure) and assign the resource pools (e.g. the side-link resource pool 104) for the V2X sessions attached to one or more slices.

Optionally, the control unit 100 can also be configured to perform the following step:
- C: Communicating the resource pool selection (e.g. the resource pool configuration 104) to the involved nodes:
  1.: To affected/involved RAN nodes using XnAP, F1 signaling
  2.: to CN Nodes (e.g. Access and Mobility Function (AMF), Session Management Function (SMF)) using NGAP signaling.

In the following, several ways of acquiring slice information at RAN by means of the control unit 100 are going to be described.

Figure 2:
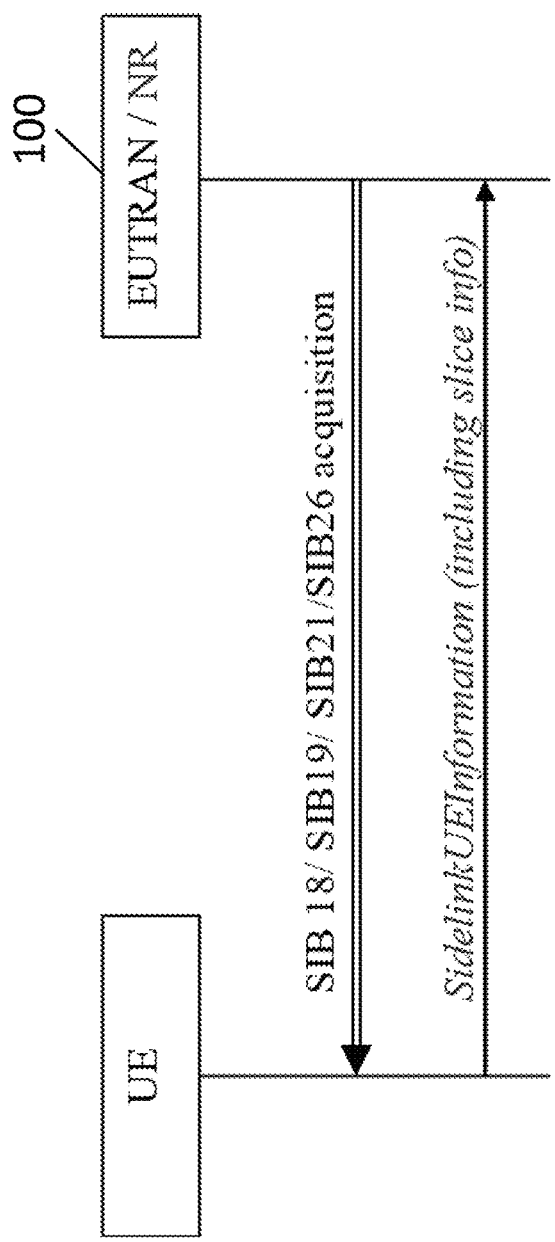
FIG. 2 shows another schematic view of an operating scenario according to the present disclosure.

Information can e.g. be obtained from a UE, as part of the session related requirements as it is now described in view of FIG. 2.

If a UE (as e.g. shown in FIG. 2) is configured by upper layers (OAM, CN) with certain slice-tailored resource pool configurations or has some interest on adapting the dedicated resource pools for a certain slice, Side-linkUEInformation message or UECapability Information message can be extended with more IEs to support slicing information (NSSAI, NR-PC5 Configuration requirement per slice).

Side-linkUEInformation (as in TS36.331):

"UE capable of side-link communication or V2X side-link communication or side-link discovery that is in RRC_CONNECTED may initiate the procedure to indicate it is (interested in) receiving side-link communication or V2X side-link communication or side-link discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon."

In this option, the inventive solution is the addition of Slice information (e.g. NSSAI, S-NSSAI, Slice Configuration Info) as a new IE of the Side-linkUEInformation RRC message.

UECapability Information (as in TS36.331, TS38.331):

The purpose of this procedure is to transfer UE radio access capability information from the UE to E-UTRAN. At least one of the following IEs can be introduced as follows:
- UE Available Slice List: the list of available slices for the UE;
- UE Slice SL Resource Pool list: the list of resource pools that can be used by this UE for each slice.

Information can also be obtained by the control unit 100 from the Core Network (CN) as example of the session and/or upper layer requirements, as described in the following:

NG Signaling includes slice information in PDU-session granularity. For NR-V2X SL, the CN may need to provide additional IEs using NG interface for the PC5 Sessions.

CN requires to know/set the slice to session mapping for PC5, because of the following reasons:
- the 5G QoS Indicator (5QI) model is re-used for PC5 (5QI is set by CN);
- slicing feature is end-to-end and controlled by CN;
- Licensed operation of NR-PC5 (which is under study in 3GPP) in FR1/FR2 spectrum bands requires the session resource setup by CN.

In this solution, the PC5 Session information including slicing information can be carried using NG signaling at UE Context Setup/Modification Request messages (from AMF to RAN), see TS 38.413 section 9.2.2.

Figure 3:
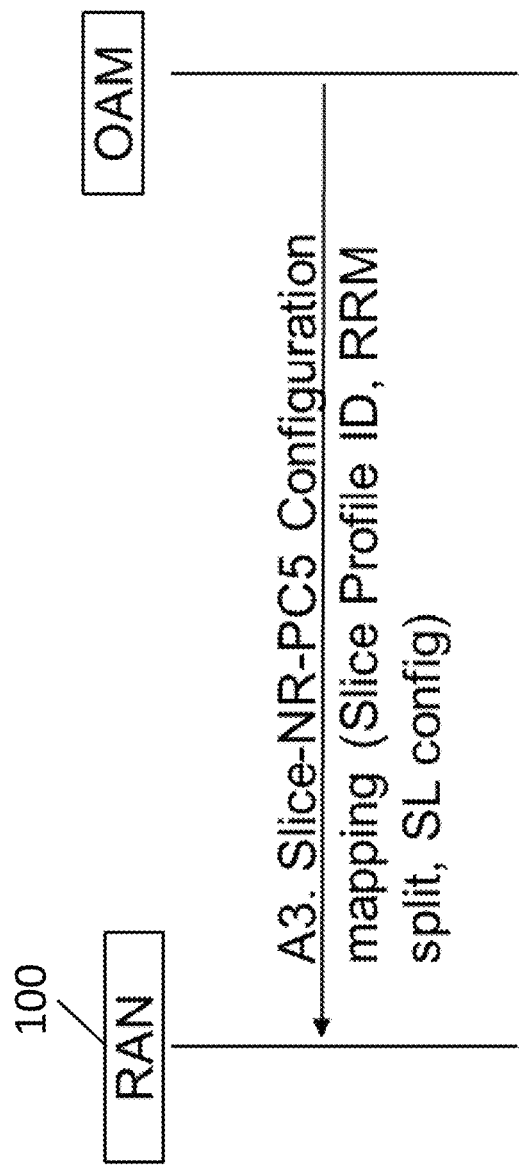
FIG. 3 shows another schematic view of an operating scenario according to the present disclosure.

Additional Information Elements (IEs) in UE Context Setup/Modification Request message over NGAP can be at least one of the following parameters:

PC5 Session Resource Setup Request List
- V2X Service ID: the identifier of the V2X service (global identifier as set by the network and/or application)
- Group-UE ID (the identifier for a set of UEs for group communications)
- S-NSSAI/NSSAI (the slice/SST identifier for the session)
- PC5 Session Resource Setup Request Transfer (the SL resource setup request for the session)
- UE Side-link AMBR (parameters for the authorization of the PC5 session)
- SL QOS levels (5QI, PPPP) per LoA and/or slice Information can also be obtained by the control unit 100 from the OAM as example of upper layer requirement and as described in the following and in view of FIG. 3:

OAM (SA5) configures the RAN part of the V2X SL slice, using slice-tailored parameters (RRM policies, protocol/functional configurations) via Service-based Interface (SBI) or Itf-N.

A Slice-NR-PC5 Configuration message can be sent from OAM to RAN (in which the control unit 100 is located) with at least one of the following parameters:
- Slice Profile ID;
- NSSAI;
- RRM Policies for PC5 resources;
- PC5 monitoring configuration policies.

Figure 4:
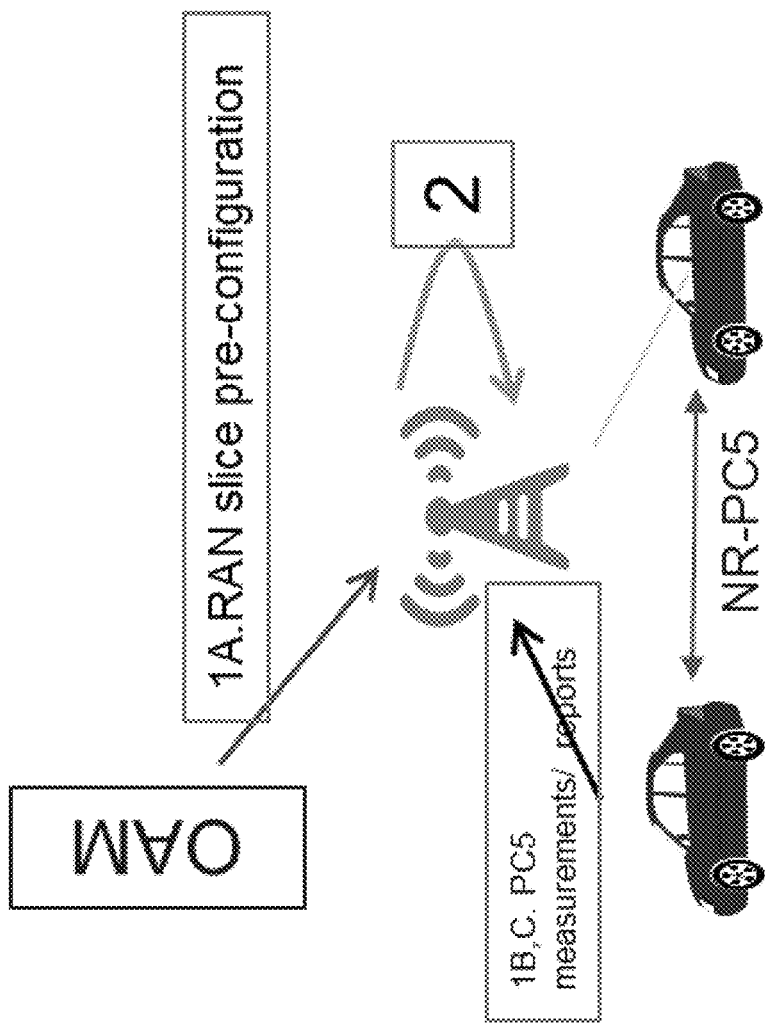
FIG. 4 shows another schematic view of an operating scenario according to the present disclosure.

In the following, resource pool configuration for 1:N or N:1 slice to resource pool mapping (which relates to the side-link resource pools 104) is going to be described, in particular in view of FIG. 4.

The assignment of resource pools to different slices is an RRC/RRM functionality which (see 1. and 2.):

1. Takes as input at least one of the following:
   A: The OAM is extended for PC5 RAN slice pre-configuration parameters (as described in view of FIG. 3 and SA5 in TS28.531) and the RAN KPI per slice, e.g.:
   X1 side-link resource pools for slice 1, X2 for slice 2, ...
   or side-link capacity proportional split (e.g. 30% slice 1, 70% slice 2)
   B: Expected/Actual NR-PC5 radio channel conditions/load monitoring by the UEs
   C: Slice information from Network and/or UE (see sections above)
2. Performs the selection of side-link resource pools per slice based on the inputs in RRC/RRM, given the target objective:

In case of distributed selection of resource pools (e.g. iterative optimization), this involves also UE-associated RRC-to-MAC signaling which may impact F1 for CU-DU splits.

In case of Dual Connectivity (DC), for multi-Radio Access Technology (RAT) deployment (opt. 4/7); the selection of pools per UE/session may come after negotiation between MN and SN (in Xn/X2). So, a negotiation phase may be needed before the selection (e.g. hypothetical resource pool selection).

In the following, communicating the resource pool configuration 104 to other network nodes is going to be described:

The interaction of the control unit 100 with other network nodes (core network nodes and/or RAN nodes, in particular a gNB, eNB, CU, DU, MN, SN, RSU) is essential for notifying involved entities for the resource pool configuraton. This may allow at least one of the following operations:

Core Network to be informed by RAN for charging, session/mobility management and resource monitoring purposes.

Other gNBs/eNBs to be informed for optimizing RRM in a multi-cell environment, e.g. avoiding interfence at the cell edges or for mobility management purposes (e.g. one or more vehicles of the V2X service is in coverage of other gNB/eNB).

In CU/DU split, the DU to be informed by the CU so as to perform MAC scheduling of the side-link resources in real-time.

In Dual Connectivity, in particular MN/SN architecture (Arch. Option 4/7), SN or MN to be aware of the resource pool configuration since the resource pools may be owned by the SN or MN and vehicles of the V2X service may be connected to both of them.

In RoadSide Unit (RSU) scenario, the RSU (gNB or UE) to be informed by the RAN node that performs the configuration in order to schedule the SL resources in mode 1 operation.

Figure 5:
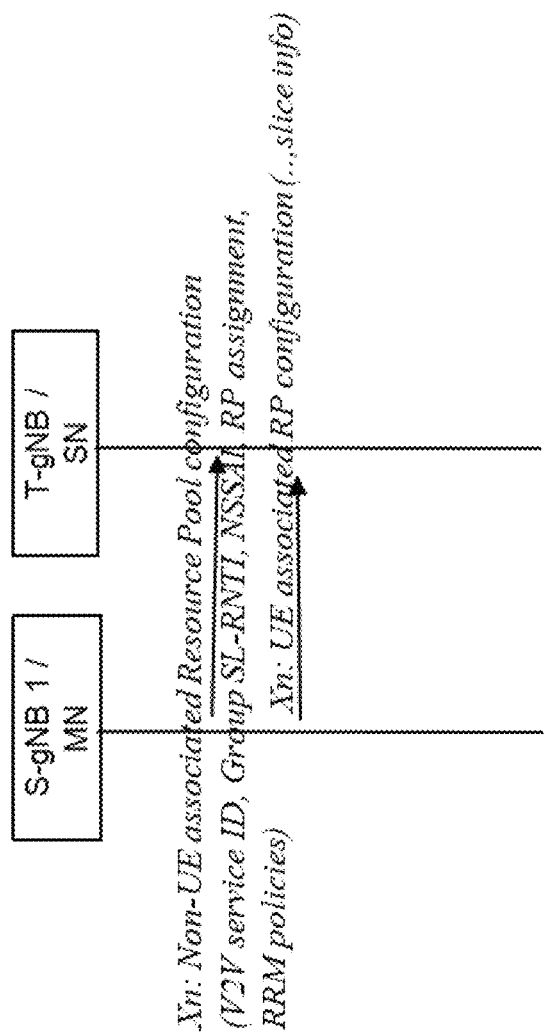
FIG. 5 shows another schematic view of an operating scenario according to the present disclosure.
Figure 6:
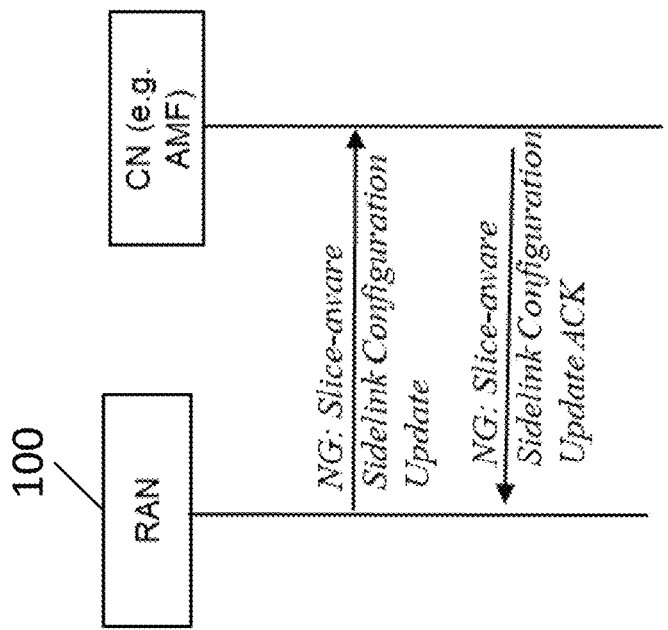
FIG. 6 shows another schematic view of an operating scenario according to the present disclosure.

In FIG. 5 and FIG. 6, message charts for interacting with other gNBs and with other CN is shown. As a particular embodiment, Xn and NG signaling are shown. However, this can also be applied to interfaces like F1, X2, S1, given the scenario as described above.

In view of FIG. 5, the exchange of a resource pool configuration message per slice for side-link resources using X2/Xn/F1 signaling is now described.

This applies to scenarios when the V-UEs belong to different cells (or when V-UEs need to Handover (HO) to neighboring gNB. This message may include Resource Pool (RP) configuration and assignment parameters for the V2X SL Slice.

Two options for the resource pool configuration message can be possible:

UE-Associated (Only for Mode 1):
For the case of Dual Connectivity and MN and SN architecture, MN is responsible for configuring the UE. If MN/SN are different RAT, the resources may be "owned" by SN, so SN needs to send it to MN, so SN may e.g. send which resource this UE may use.

The UE associated Resource Pool Configuration message can include at least one of the following parameters:
- V2X Service ID or V2X service type
- UE ID or Group UE ID or Group SL-RNTI
- Resource Pool (RP) Assignment information (e.g. mapping table, list, matrix)
- NSSAI/S-NSSAI
- Slice RRM Policies
- Thresholds
- Time Validity
- and/or Non-UE Associated (for Mode 1 or Mode 2):
This information may be exchanged between gNBs for HO purposes for the assignment of resource pools for a slice in a given geographical area.

Non-UE associated Resource Pool Configuration message includes at least one of the following parameters:
- V2X Service ID;
- Resource Pool (RP) Assignment information (e.g. mapping table, list, matrix);
- NSSAI/S-NSSAI;
- Slice RRM Policies;
- Geographical Area;
- Thresholds;
- Time Validity.

In view of FIG. 6, the notification of a CN (e.g. AMF/SMF) of the resource pool configuration/assignment per V2X group/slice is now going to be described.

This is required for allowing CN to either get slice analytics, perform charging, interact with application server via NEF, for mobility and session management purposes. It can either be done in Non-UE associated or UE-associated type of interactions.

Non-UE-Associated:

Non-UE-associated interaction in a new message or extension (RAN SIDE-LINK CONFIGURATION UPDATE message) allows to provide the resource pool configuration information to Core Network. A Slice-aware Side-link Configuration Update (non-UE specific) reporting is sent by the NG-RAN node to transfer updated information for the side-link interface instance and an acknowledgment is sent back upon reception from Core (AMF).

At least one of the following parameters can be included in Slice-aware Side-link Configuration Update message (non-UE specific):
  V2X Service ID;
  Abstracted Resource Pool (RP) Assignment information (e.g. mapping table, list, matrix);
  NSSAI/S-NSSAI;
  Update of Configuration;
  Geographical Area;
  Thresholds;
  Time Validity;
  Slice Statistics.

UE-Associated:

UE-associated interaction with CN allows to provide the resource pool configuration information. A Slice-aware Side-link Configuration Update (UE specific) reporting is sent by the NG-RAN node to transfer updated information for the side-link interface instance for a particular UE of group of UEs and an acknowledgment is sent back upon reception from Core (AMF)

At least one of the following parameters can be included in Slice-aware Side-link Configuration Update message (UE Specific):
  V2X Service ID;
  UE ID/Group UE ID;
  Abstracted Resource Pool (RP) Assignment information (e.g. mapping table, list, matrix);
  NSSAI/S-NSSAI;
  Update of Configuration;
  Thresholds;
  Time Validity;
  UE/Slice Statistics.

Figure 7:
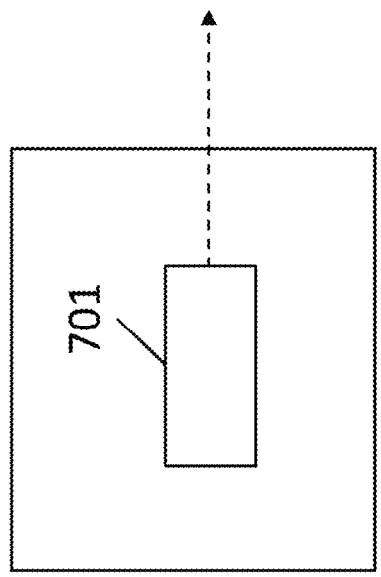
FIG. 7 shows a schematic view of a terminal device according to an embodiment of the present disclosure.

FIG. 7 shows a schematic view of a terminal device 700 according to an embodiment of the present disclosure. The terminal device 700 is for performing side-link communication. Therefore the terminal device 700 is configured to generate a session requirement 701, the session requirement 701 including information for configuring a side-link communication for at least one slice 101. The terminal device 700 is further configured to provide the generated session requirement 701 to the control unit 100. That is, the session requirement 701 of FIG. 9 is the sessions requirement 103 of FIG. 1.

Figure 8:
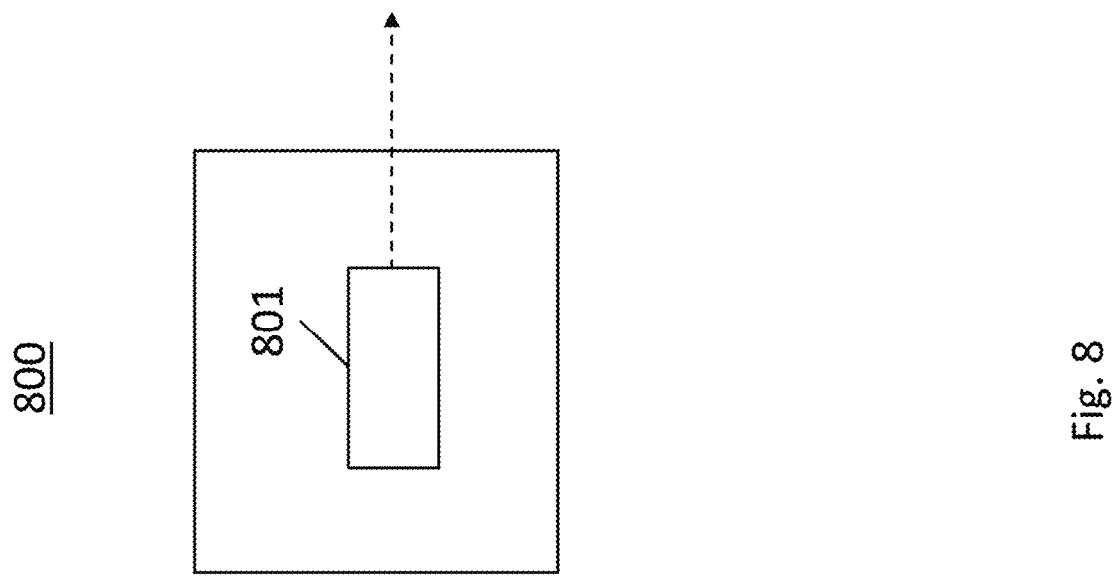
FIG. 8 shows a schematic view of a management entity according to an embodiment of the present disclosure.

FIG. 8 shows a schematic view of a management entity 800 according to an embodiment of the present disclosure. The management entity 800 is for managing side-link communication for at least one slice 101 of a communication network. Therefore the management entity 800 is configured to generate an upper layer requirement 801 for the at least one slice 101. Further, the management entity 800 is configured to provide the generated upper layer requirement 801 to the control unit 100. That is, the upper layer requirement 801 of FIG. 10 is the upper layer requirement 102 of FIG. 1.

Figure 9:
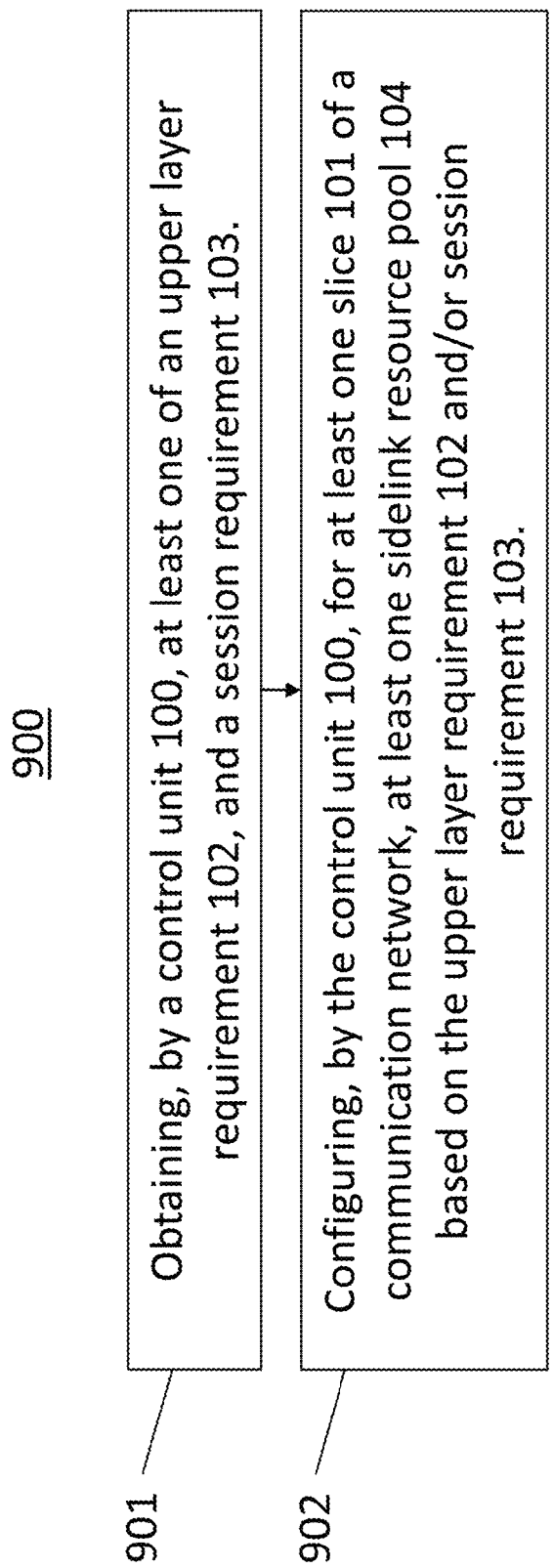
FIG. 9 shows a schematic view of a method according to an embodiment of the present disclosure.

FIG. 9 shows a schematic view of a method 900 according to an embodiment of the present disclosure. The method 900 is for assisting side-link communication for at least one slice 101 of a communication network. To this end, the method 900 comprises the steps of obtaining 901, by a control unit 100, at least one of an upper layer requirement 102, and a session requirement 103, and configuring 902, by the control unit 100, for the at least one slice 101, at least one side-link resource pool 104 based on the upper layer requirement 102 and/or session requirement 103.

Figure 10:
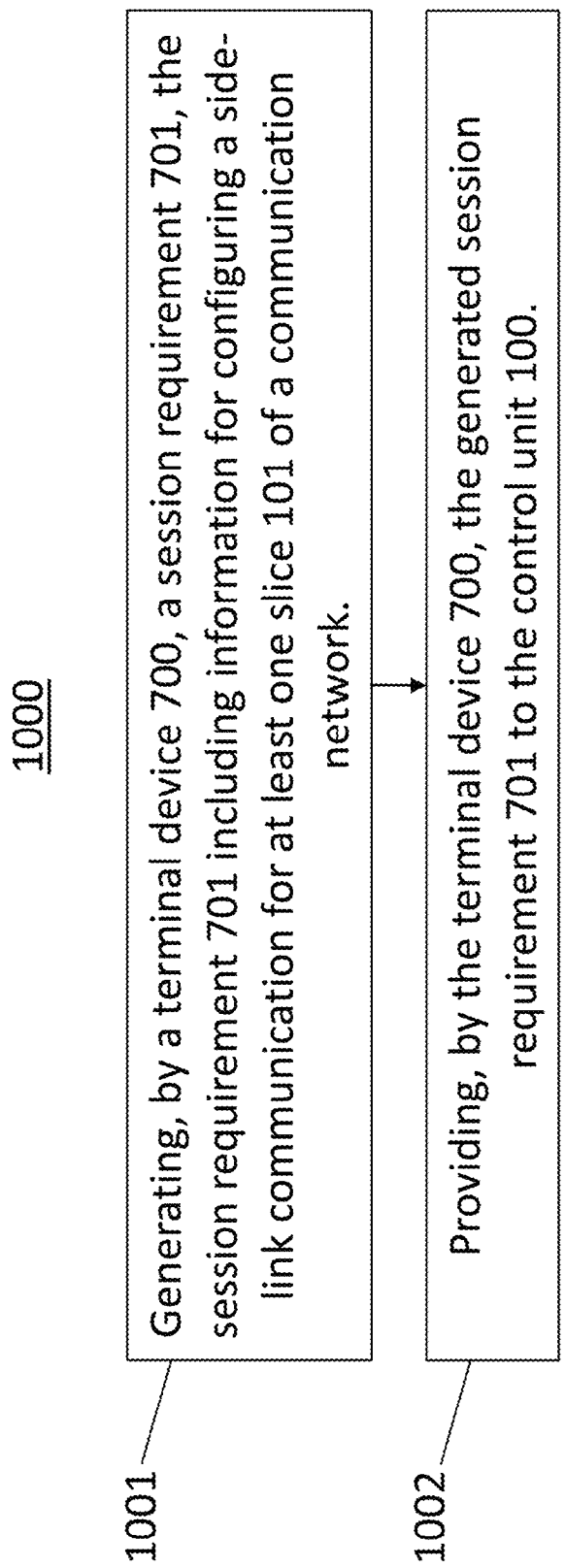
FIG. 10 shows a schematic view of a method according to an embodiment of the present disclosure.

FIG. 10 shows a schematic view of a method 1000 according to an embodiment of the present disclosure. The method 1000 comprises the steps of generating 1001, by a terminal device 700, a session requirement 701, the session requirement 701 including information for configuring a side-link communication for at least one slice 101; and providing 1002, by the terminal device 700, the generated session requirement 701 to the control unit 100.

Figure 11:
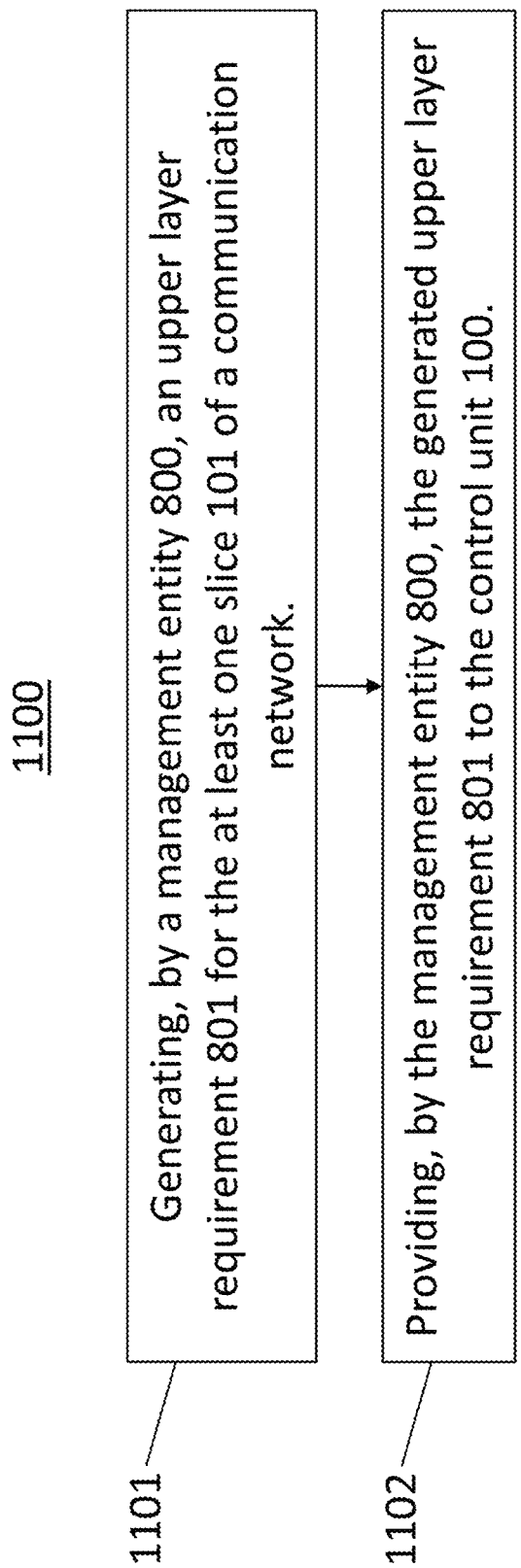
FIG. 11 shows a schematic view of a method according to an embodiment of the present disclosure.

FIG. 11 shows a schematic view of a method 1100 according to an embodiment of the present disclosure. The method 1100 comprises the steps of generating 1101, by a management entity 800, an upper layer requirement 801 for the at least one slice 101: and providing 1102, by the management entity 1100, the generated upper layer requirement 801 to the control unit 100.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A controller for assisting side-link communication for at least one slice of a communication network, wherein the controller is configured to:
  obtain at least one of an upper layer requirement, and a session requirement;
  configure, for the at least one slice, at least one side-link resource pool based on one of the upper layer requirement or session requirement;
  provide notification information to a further network node about the side-link resource pool configuration, wherein the notification information comprises at least one of:
    configuration update notification information for at least one session;
    resource pool configuration parameters;
    terminal device-related statistics for the terminal device utilizing side-link resources;
    configuration update notification information for at least one slice coverage area; and
    slice-related statistics for the slice utilizing side-link resources, and wherein the resource pool configuration parameters include at least one of:

session configuration parameters for configuring a terminal device associated to at least one slice; and
slice configuration parameters for configuring a geographical area.

2. The controller according to claim 1, further configured to obtain the upper layer requirement from a management entity or application entity.

3. The controller according to claim 1, wherein the upper layer requirement includes at least one of the following configuration parameters:
at least one of slice identifier or Network Slice Network Slice Selection Assistance Information (NSSAI), and slice profile identifier;
Slice policies per side-link service for a network domain;
slice mapping information for mapping at least one of a session and a service to at least one slice; and
mode mapping information for mapping a service to a first or a second operation mode;
geographical area;
time validity;
application or network management statistics and analytics on at least one of network and application related conditions.

4. The controller according to claim 1, wherein the session requirement includes at least one of the following parameters:
at least one of slice identifier and S-NSSAI/NSSAI;
session identifier;
group terminal device information identifier;
Session Resource Setup Request Transfer for side-link session;
Side-link Aggregate Maximum Bit Rate (AMBR);
Side-link Quality of Service (QOS) levels;
mode mapping information for mapping a service to a first or a second operation mode;
a list of available slices for the terminal device; and
a list of resource pools available to the terminal device for each slice.

5. The controller according to claim 1, wherein the session requirement includes at least one of a network requirement obtained by a network entity and a terminal device requirement obtained from a terminal device for side-link communication.

6. The controller according to claim 1, wherein the at least one side-link resource pool configuration (comprises at least one of the following parameters:
one of slice identifier, NSSAI or S-NSSAI;
group terminal device information identifier;
allocated resources per side-link session;
Common Rx Pool List;
Common Tx Pool List;
side-link Resource Pool Configuration information;
Slice Radio Resource Management (RRM) Policies;
Resource Selection information;
geographical area;
time validity; and
mode mapping information for mapping a service to a first or a second operation mode.

7. The controller according to claim 1, wherein the controller is configured to provide the side-link resource pool configuration to a network node using at least one of X2, XnAP, F1, and NGAP signaling.

8. A terminal device for performing side-link communication, wherein the terminal device is configured to:
generate a session requirement, the session requirement including information for configuring a side-link communication for at least one slice; and
provide the generated session requirement to the controller, wherein the controller is configured to:
provide notification information to a further network node about the side-link resource pool configuration, wherein the notification information comprises at least one of:
configuration update notification information for at least one session;
resource pool configuration parameters;
terminal device-related statistics for the terminal device utilizing side-link resources;
configuration update notification information for at least one slice coverage area; and
slice-related statistics for the slice utilizing side-link resources, and wherein the resource pool configuration parameters include at least one of:
session configuration parameters for configuring a terminal device associated to at least one slice; and
slice configuration parameters for configuring a geographical area.

9. A management entity for managing side-link communication for at least one slice of a communication network, wherein the management entity is configured to:
generate an upper layer requirement for the at least one slice;
provide the generated upper layer requirement to the controller,
wherein the controller is configured to:
provide notification information to a further network node about the side-link resource pool configuration, wherein the notification information comprises at least one of:
configuration update notification information for at least one session;
resource pool configuration parameters;
terminal device-related statistics for the terminal device utilizing side-link resources;
configuration update notification information for at least one slice coverage area; and
slice-related statistics for the slice utilizing side-link resources, and wherein the resource pool configuration parameters include at least one of:
session configuration parameters for configuring a terminal device associated to at least one slice; and
slice configuration parameters for configuring a geographical area.

10. A method for assisting side-link communication for at least one slice of a communication network, wherein the method comprises the steps of:
obtaining, by a controller, at least one of an upper layer requirement, and a session requirement; and
configuring, by the controller, for the at least one slice, at least one side-link resource pool based on at least one of the upper layer requirement and session requirement;
providing, by the controller, notification information to a further network node about the side-link resource pool configuration, wherein the notification information comprises at least one of:
configuration update notification information for at least one session;
resource pool configuration parameters;
terminal device-related statistics for the terminal device utilizing side-link resources;
configuration update notification information for at least one slice coverage area; and slice-related statistics for the slice utilizing side-link resources, and wherein the resource pool configuration parameters include at least one of:
session configuration parameters for configuring a terminal device associated to at least one slice; and
slice configuration parameters for configuring a geographical area.

11. A method for performing side-link communication, wherein the method comprises the steps of:
generating, by a terminal device, a session requirement, the session requirement including information for configuring a side-link communication for at least one slice; and
providing, by the terminal device, the generated session requirement to the controller,
providing, by the controller, notification information to a further network node about the side-link resource pool configuration, wherein the notification information comprises at least one of:
configuration update notification information for at least one session;
resource pool configuration parameters;
terminal device-related statistics for the terminal device utilizing side-link resources;
configuration update notification information for at least one slice coverage area; and
slice-related statistics for the slice utilizing side-link resources, and wherein the resource pool configuration parameters include at least one of:
session configuration parameters for configuring a terminal device associated to at least one slice; and
slice configuration parameters for configuring a geographical area.

12. A method for managing side-link communication for at least one slice of a communication network, wherein the method comprises the steps of:
generating, by a management entity, an upper layer requirement for the at least one slice; and
providing, by the management entity, the generated upper layer requirement to the controller,
providing, by the controller, notification information to a further network node about the side-link resource pool configuration, wherein the notification information comprises at least one of:
configuration update notification information for at least one session;
resource pool configuration parameters;
terminal device-related statistics for the terminal device utilizing side-link resources;
configuration update notification information for at least one slice coverage area; and
slice-related statistics for the slice utilizing side-link resources, and wherein the resource pool configuration parameters include at least one of:
session configuration parameters for configuring a terminal device associated to at least one slice; and
slice configuration parameters for configuring a geographical area.

* * * * *

UNITED STATES PATENT AND TRADEMARK OFFICE
CERTIFICATE OF CORRECTION

PATENT NO. : 12,144,009 B2
APPLICATION NO. : 17/486560
DATED : November 12, 2024
INVENTOR(S) : Pateromichelakis et al.

Page 1 of 1

It is certified that error appears in the above-identified patent and that said Letters Patent is hereby corrected as shown below:

In the Claims

Claim 4: Column 15, Line 33: "Side-link Quality of Service (QOS) levels;" should read as -- Side-link Quality of Service (QoS) levels; --.

Signed and Sealed this
Third Day of June, 2025

Coke Morgan Stewart
*Acting Director of the United States Patent and Trademark Office*